(12) United States Patent
Takasaki et al.

(10) Patent No.: US 11,069,483 B2
(45) Date of Patent: Jul. 20, 2021

(54) THIN FILM CAPACITOR

(71) Applicant: TDK Corporation, Tokyo (JP)

(72) Inventors: Hiroshi Takasaki, Tokyo (JP); Masahiro Hiraoka, Tokyo (JP); Hitoshi Saita, Tokyo (JP)

(73) Assignee: TDK Corporation, Tokyo (JP)

( * ) Notice: Subject to any disclaimer, the term of this patent is extended or adjusted under 35 U.S.C. 154(b) by 15 days.

(21) Appl. No.: 16/141,031

(22) Filed: Sep. 25, 2018

(65) Prior Publication Data

US 2019/0096588 A1 Mar. 28, 2019

(30) Foreign Application Priority Data

Sep. 28, 2017 (JP) .............................. JP2017-188358

(51) Int. Cl.
*H01G 4/008* (2006.01)
*H01G 4/12* (2006.01)
*H01G 4/33* (2006.01)

(52) U.S. Cl.
CPC ............... *H01G 4/33* (2013.01); *H01G 4/008* (2013.01); *H01G 4/12* (2013.01); *H01G 4/1227* (2013.01); *H01G 4/1218* (2013.01); *H01G 4/1245* (2013.01); *H01G 4/1254* (2013.01)

(58) Field of Classification Search
CPC .. H01G 4/30; H01G 4/33; H01G 4/12; H01G 4/005; H01G 4/1227; H01G 4/008

USPC ................ 361/321.1, 321.2, 301.4, 311, 313
See application file for complete search history.

(56) References Cited

U.S. PATENT DOCUMENTS

| | | | |
|---|---|---|---|
| 2005/0079670 A1 | 4/2005 | Takeshima et al. | |
| 2013/0208399 A1* | 8/2013 | Morita | H01G 4/30 361/301.4 |
| 2015/0302989 A1* | 10/2015 | Choi | H01G 4/012 29/25.03 |
| 2016/0163461 A1* | 6/2016 | Chen | H01G 4/30 361/272 |
| 2016/0189865 A1* | 6/2016 | Kawamura | H01G 4/1227 361/301.4 |
| 2018/0012706 A1* | 1/2018 | Bultitude | H01G 4/002 |

FOREIGN PATENT DOCUMENTS

| | | |
|---|---|---|
| JP | H05-299285 A | 11/1993 |
| JP | 2006-66542 A | 3/2006 |
| JP | 2010-278346 A | 12/2010 |
| JP | 2013-128151 A | 6/2013 |

* cited by examiner

*Primary Examiner* — Arun Ramaswamy
(74) *Attorney, Agent, or Firm* — Faegre Drinker Biddle & Reath LLP

(57) ABSTRACT

A thin film capacitor includes a first electrode layer (10), a dielectric layer (20) stacked on the first electrode layer (10), and a second electrode layer (30) stacked on the dielectric layer (20), wherein the dielectric layer (20) includes a layered void aggregation region (22) which extends in a direction orthogonal to a stacking direction.

4 Claims, 6 Drawing Sheets

THIN FILM CAPACITOR

TECHNICAL FIELD

An aspect of the present invention relates to a thin film capacitor.

BACKGROUND

Conventionally, studies on thin film capacitors having a dielectric film which has a high dielectric constant and also has excellent leakage current characteristics have been performed. For example, Japanese Unexamined Patent Publication No. 2006-66542 discloses that heat treatment is performed twice on a raw material solution of a dielectric film applied to a lower electrode. In addition, Japanese Unexamined Patent Publication No. 2010-278346 discloses that two dielectric layers are stacked and fired.

SUMMARY

However, recently, higher performance of a thin film capacitor including a dielectric layer has been required. In this connection, each of the thin film capacitors described in Patent Documents 1 and 2 has room for further improvement in leakage current characteristics.

The present invention has been made in view of the above description, and it is an object of the present invention to provide a thin film capacitor with improved leakage current characteristics.

The inventors have found that leakage current characteristics are improved when a dielectric layer includes a layered void aggregation region extending in a direction orthogonal to a stacking direction of the dielectric layer.

That is, a thin film capacitor according to one aspect of the present invention includes a first electrode layer, a dielectric layer stacked on the first electrode layer, and a second electrode layer stacked on the dielectric layer, wherein the dielectric layer includes a layered void aggregation region which extends in a direction orthogonal to a stacking direction.

Here, the void aggregation region may have a thickness of 5% to 50% of a thickness of the dielectric layer.

When the thickness of the void aggregation region is within the above-described range with respect to the thickness of the dielectric layer, it is possible to prevent deterioration in performance in a thin film capacitor while minimizing leakage current characteristics due to the void aggregation region.

According to the present invention, a thin film capacitor with improved leakage current characteristics is provided.

DETAILED DESCRIPTION

Figure 1:
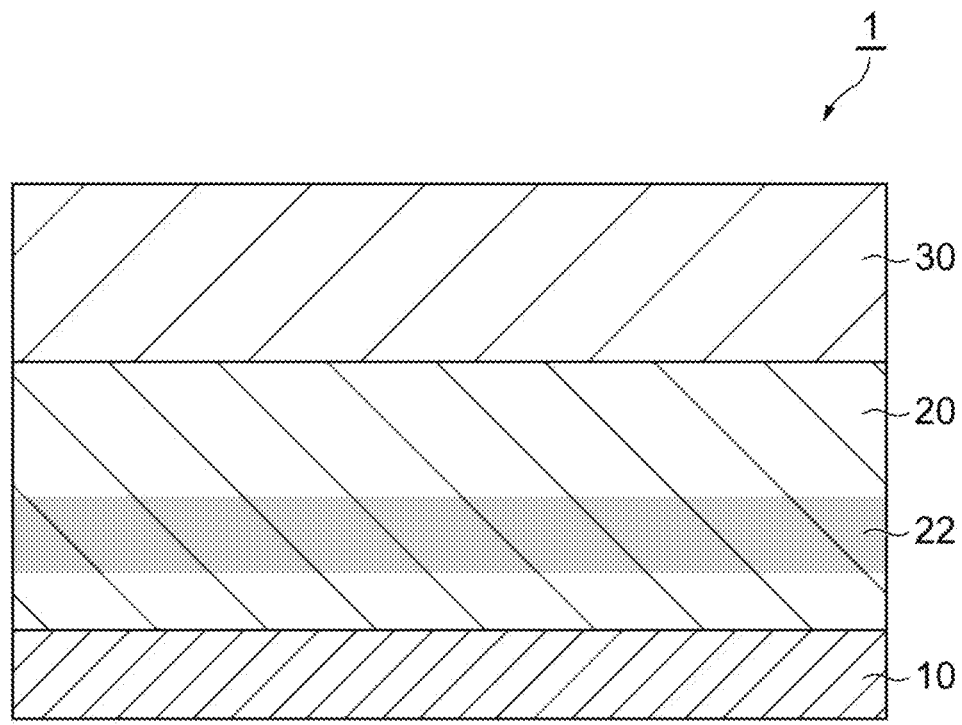
FIG. 1 is a cross-sectional view schematically showing a thin film capacitor according to one embodiment of the present invention.

Hereinafter, the best embodiments for carrying out the present invention will be described in detail with reference to the accompanying drawings. In the description of the drawings, elements which are the same are designated by the same reference numerals, and redundant explanations will be omitted.

FIG. 1 is a cross-sectional view schematically showing a thin film capacitor according to one embodiment of the present invention. The thin film capacitor 1 shown in FIG. 1 is a so-called thin film capacitor (TFCP) and is, for example, a capacitor mounted on a substrate used for a communication terminal or the like. The thin film capacitor 1 includes a first electrode layer 10, a dielectric layer 20 stacked on the first electrode layer 10, and a second electrode layer 30 stacked on the dielectric layer. The dielectric layer 20 is sandwiched between the first electrode layer 10 and the second electrode layer 30.

In this specification, a "stacking direction" is a direction in which the first electrode layer 10, the dielectric layer 20 and the second electrode layer 30 are superimposed in turn. In addition, "upward in the stacking direction" refers to the second electrode layer 30 side, and "downward in the stacking direction" refers to the first electrode layer 10 side.

The first electrode layer 10 and the second electrode layer 30 have a flat plate shape and are formed of, for example, a metal thin film. A material of which a main component is nickel (Ni), copper (Cu), aluminum (Al), platinum (Pt), an alloy containing these metals, or an intermetallic compound is suitably used as a material constituting the first electrode layer 10 and the second electrode layer 30. However, the materials of the first electrode layer 10 and the second electrode layer 30 are not particularly limited as long as they are conductive materials. The "main component" means that a proportion of the component is 50 mass % or more. Embodiments of the first electrode layer 10 and the second electrode layer 30 include a case of a stacked structure including two or more types in addition to a case of forming an alloy or an intermetallic compound. For example, an electrode layer may be formed as a two-layer structure in which a Cu thin film is provided on a Ni thin film. Also, when pure nickel is used for the first electrode layer 10 and the second electrode layer 30, the purity of nickel is preferably 99.99% or more. Further, in the case of an alloy containing nickel, metals contained as metals other than nickel may be at least one selected from a group of platinum (Pt), palladium (Pd), iridium (Ir), rhodium (Rh), ruthenium (Ru), osmium (Os), rhenium (Re), tungsten (W), chromium (Cr), tantalum (Ta), silver (Ag) and copper (Cu). Furthermore, the first electrode layer 10 and the second electrode layer 30 may be formed of the same material or may be formed of different materials from each other.

A thickness of the first electrode layer 10 may be, for example, 0.1 μm to 200 μm. Further, a thickness of the second electrode layer 30 may be, for example, 0.1 μm to 10 μm. Furthermore, the above-described first electrode layer 10 is preferably formed of a metal foil and serves both as a substrate and an electrode. As described above, it is preferable that the first electrode layer 10 according to the embodiment also serves as a substrate, but a substrate/electrode film structure in which the first electrode layer 10 is provided on a substrate formed of Si, alumina or the like may be adopted.

The dielectric layer 20 is formed of a perovskite-based dielectric material. Here, the perovskite-based dielectric material according to the embodiment includes a dielectric (ferroelectric) material having a perovskite structure such as BaTiO$_3$ (barium titanate), (Ba$_{1-x}$Sr$_x$)TiO$_3$ (barium strontium titanate), (Ba$_{1-x}$Ca$_x$)TiO$_3$, PbTiO$_3$, Pb(Zr$_x$Ti$_{1-x}$)O$_3$ or the like, or a complex perovskite relaxor type ferroelectric material typified by Pb(Mg$_{1/3}$Nb$_{2/3}$)O$_3$, or the like. Here, for the above-described perovskite structure and perovskite relaxor type dielectric material, a ratio between A sites and B sites is usually an integer ratio, but it may be intentionally shifted from an integer ratio for the purpose of improving the characteristics. In order to control the characteristics of the dielectric layer 20, the dielectric layer 20 may optionally contain additive substances as auxiliary components. A thickness T of the dielectric layer 20 is, for example, 50 nm to 1000 nm.

The dielectric layer 20 includes a void aggregation region 22 in a partial region when seen in the stacking direction. A void is a minute air gap formed in the dielectric layer 20. The void aggregation region 22 is a region in which the voids are concentratedly formed. FIG. 1 shows an example in which the void aggregation region 22 is for in a layer shape (layer shape extending in a direction orthogonal to the stacking direction) below a center of the dielectric layer 20 in the stacking direction (on the first electrode layer 10 side). As described above, the void aggregation region 22 is a region formed in a layer in a part of the dielectric layer 20. The details of the void aggregation region 22 will be described later. In the thin film capacitor 1 according to the embodiment, a proportion occupied by the void aggregation region 22 with respect to the thickness of the dielectric layer 20 is preferably 5% to 50%, more preferably 5% to 30%. When the proportion occupied by the void aggregation region 22 with respect to the thickness of the dielectric layer 20 is within the above-described range, leakage current characteristics are improved.

Figure 2A:
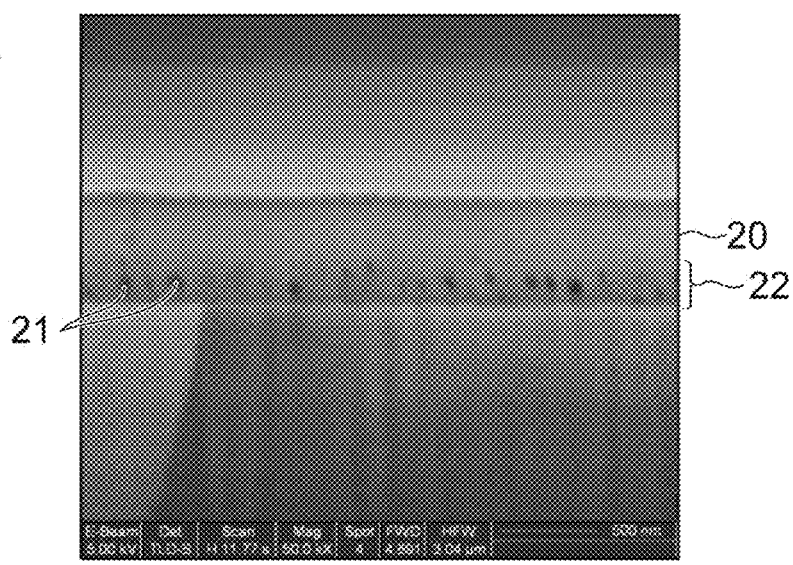
FIGS. 2A, 2B and 2C are SEM images of a cross section of the thin film capacitor.
Figure 2B:
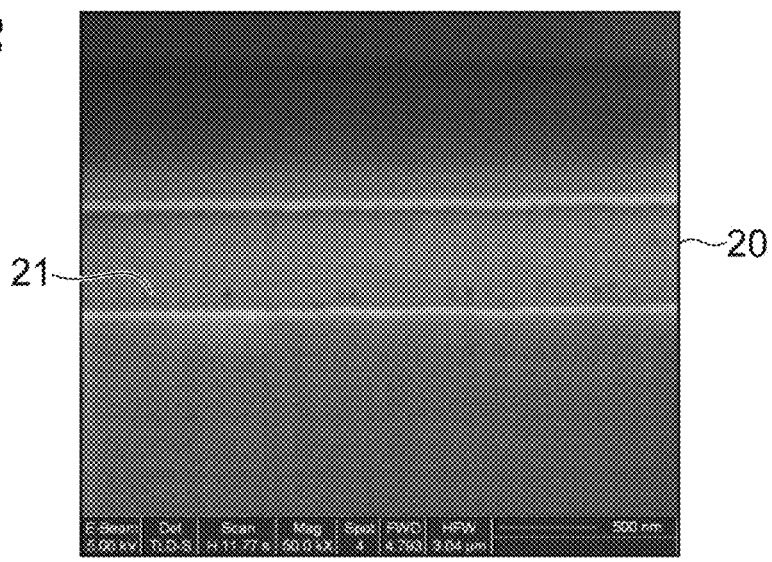
Figure 2C:
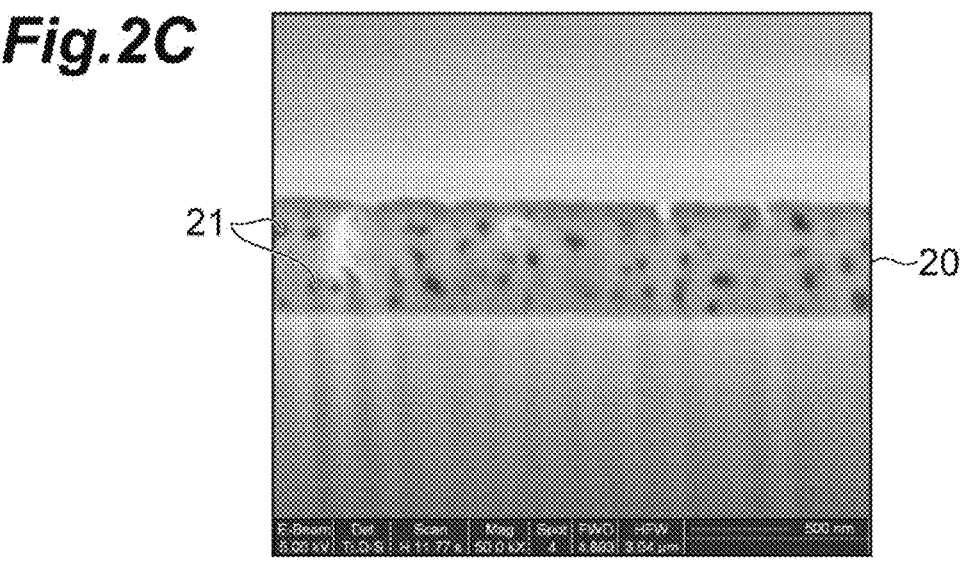

The voids included in the void aggregation region 22 will be described. FIGS. 2A to 2C show a scanning electron microscope (SEM) images of cross sections of the thin film capacitor having the void aggregation region 22 included in the above-described range and other thin film capacitors. In all of the images of FIGS. 2A to 2C, the dielectric layer 20 is shown at the center thereof.

FIG. 2A shows an example in which the void aggregation region 22 is formed in a part of the dielectric layer 20. In FIG. 2A, a plurality of voids 21 can be confirmed. It can be confirmed that the voids 21 are concentrated on the lower side of the dielectric layer 20 in the drawing and form the void aggregation region 22. Further, it can be confirmed that the number of voids in the upper portion of the dielectric layer 20 is smaller than that in the lower portion thereof in the drawing.

FIG. 2B shows an example in which the number of voids is small in the dielectric layer 20 as a whole and the void aggregation region 22 is not provided. In FIG. 2B, although the voids 21 are present in the dielectric layer 20, the number of voids 21 is small and it cannot be said that the voids 21 are concentrated in a specific region, as compared with the example shown in FIG. 2A.

FIG. 2C shows an example in which a large number of voids 21 are formed in the entire dielectric layer 20. In FIG. 2C, as shown in FIG. 2A, the voids 21 are not concentrated in a specific region and are dispersed in the entire dielectric layer 20. In other words, most of the region of the dielectric layer 20 is in a state as if it were the void aggregation region 22.

Among the examples shown in FIGS. 2A to 2C, the thin film capacitor 1 according to the embodiment is characterized in that the layered void aggregation region 22 is formed only in a part of the dielectric layer 20, as shown in FIG. 2A.

The leakage current characteristics in the thin film capacitor 1 are improved by having such a structure.

In FIG. 2C, most of the regions are void aggregation regions 22. However, in the example shown in FIG. 2C, all of the layers are not the void aggregation regions 22 as described later. Therefore, the leakage current characteristics in the thin film capacitor 1 are improved even with the configuration shown in FIG. 2C. However, when the proportion occupied by the void aggregation region 22 is in a specific range, the leakage current characteristics are improved and a high performance can be maintained for a thin film capacitor.

Next, a method of manufacturing the thin film capacitor 1 will be described. First, a metal thin film to be the first electrode layer 10 is prepared and placed on a substrate. Then, a dielectric film is stacked on a main surface of the first electrode layer 10 on the substrate and fired to form the dielectric layer 20. Finally, the second electrode layer 30 is stacked on the dielectric layer 20. For example, the second electrode layer 30 may be formed by a known method such as DC sputtering.

It is thought that the number or the distribution of the voids 21 in the dielectric layer 20 vary according to a temperature of the substrate at the time of forming the dielectric film to be the dielectric layer 20, that is, a temperature of the substrate on which the metal thin film to be the first electrode layer 10 is placed. When a temperature of the substrate is about 400° C. at the time of film formation by a sputtering method, the void aggregation region 22 is formed in a part of the dielectric layer 20 as shown in FIG. 2A. When the temperature of the substrate is higher than in the above-described conditions, the number of voids 21 decreases and the void aggregation region 22 is not formed, as shown in FIG. 2B. When the temperature of the substrate is lower than in the above-described conditions, many voids 21 are formed, and the voids 21 are formed on the entire dielectric layer 20 as shown in FIG. 2C. As described above, the number or distribution of the voids 21, that is, the formation state of the void aggregation region 22 varies according to the temperature conditions, particularly, when the dielectric film to be the dielectric layer 20 is formed, among the manufacturing conditions. Therefore, the formation of the void aggregation region 22 can be controlled by changing the temperature conditions when the dielectric film to be the dielectric layer 20 is formed.

Next, a method of identifying the voids 21 forming the void aggregation region 22 and the void aggregation region 22 will be described with reference to FIGS. 3A to 5.

The voids 21 are minute air gaps in the dielectric layer 20, but more specifically, in a cross section in the stacking direction, they are areas in which there is no dielectric material in the dielectric layer 20. There are many minute voids in the dielectric layer 20, but the void 21 defined in this embodiment has an outer diameter of 10 nm or more.

Figure 3A:
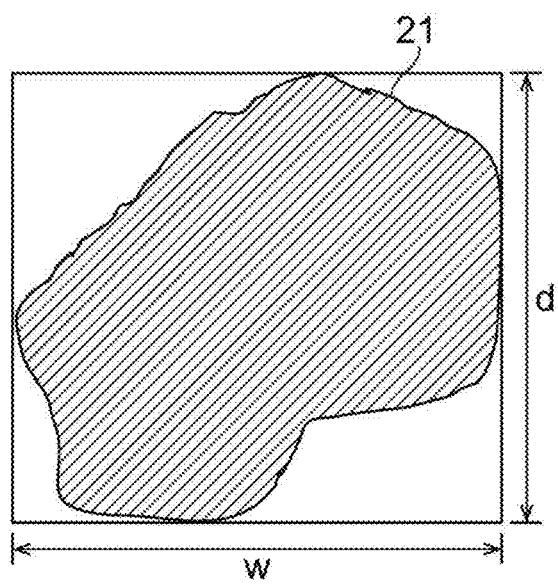
FIGS. 3A and 3B are diagrams for explaining voids.
Figure 3B:
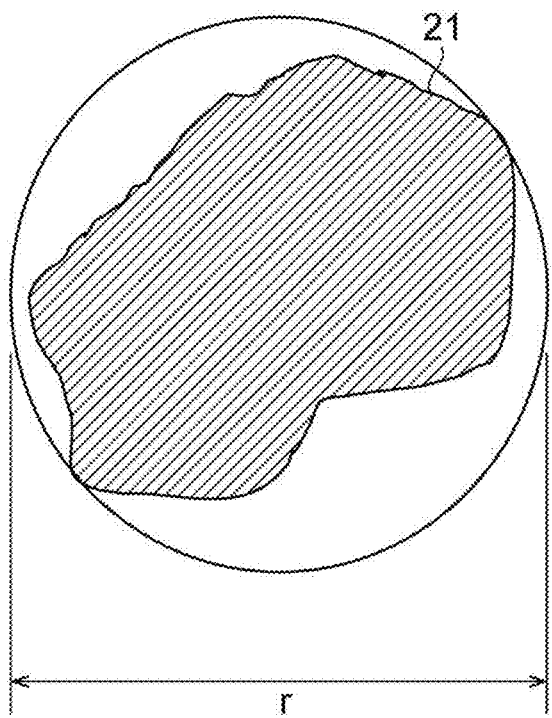

FIGS. 3A and 3B are views for explaining a size of the void 21. The void 21 having an outer diameter of 10 nm or more refers to a void having a height d of 10 nm or more in the stacking direction in a case in which a circumscribed rectangle circumscribing the void 21 is provided as shown in FIG. 3A when a cross-sectional image of the dielectric layer 20 in the stacking direction is captured. A length w thereof in a direction orthogonal to the stacking direction is preferably larger than 10 nm. Further, as shown in FIG. 3B, when a circumscribed circle circumscribing the void 21 as the void 21 having an outer diameter of 10 nm or more is provided, it may be defined that a diameter r thereof is 10 nm or more. In addition, the above two criteria (the height d of the circumscribed rectangle is 10 nm or more, and the diameter r of the circumscribed circle is 10 nm or more) may be used together.

In the above-described "void 21 having an outer diameter of 10 nm or more", three pixels or more of the pixels for imaging the air gap are continuous in one direction when the resolution of the SEM used for imaging the cross section of the dielectric layer 20 is 3 nm per pixel. Therefore, in analyzing of an SEM image or the like, when three or more pixels identified as imaging a void are arranged in one direction (for example, the stacking direction), it is determined that the pixels are pixels of the image of the void 21, and it is possible to identify the region of a continuous air gap including the pixels as the void 21.

Figure 4:
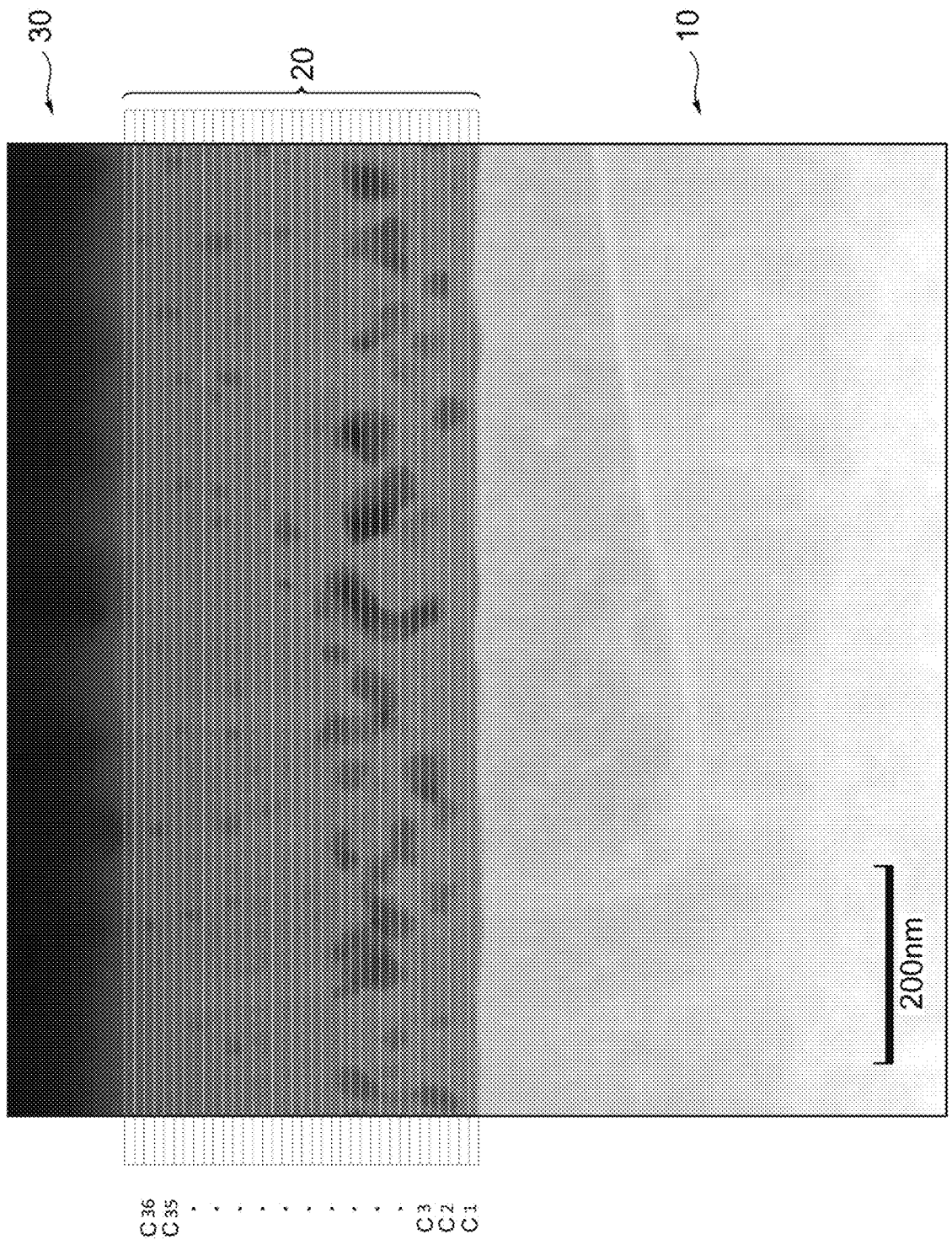
FIG. 4 is a diagram for explaining a method of identifying a void aggregation region.

Next, identification of the void aggregation region 22 will be described with reference to FIG. 4. The identification of the void aggregation region 22 is performed by analyzing an SEM image of the dielectric layer 20. FIG. 4 shows an SEM image obtained by imaging the first electrode layer 10, the dielectric layer 20 and the second electrode layer 30. Also in the SEM image shown in FIG. 4, it can be confirmed that a plurality of voids 21 are present in the dielectric layer 20.

As described above, the void aggregation region 22 is a layer formed in a layer shape which extends in a direction orthogonal to the stacking direction. Therefore, when the void aggregation region 22 is identified, the dielectric layer 20 is divided into much finer layers, and it is determined whether or not each layer corresponds to the void aggregation region 22.

In the example shown in FIG. 4, the dielectric layer 20 having a thickness of 360 nm is sectioned every 10 nm, and layers C1 to C36 are fox wed in order from the bottom. When the void aggregation region 22 is identified in the SEM image in FIG. 4, firstly, a region to be the voids 21 is identified by the above procedure, and a region indicating the voids 21 and other regions are then binarized and distinguished. Thereafter, when two or more layers having a proportion of 5% or more occupied by the voids 21 in a cross-sectional area of each of the layers are continuous, that is, when a layer in which the proportion including the voids 21 is 5% or more continues 20 nm or more in the stacking direction, this region is set as the void aggregation region 22.

Figure 5:
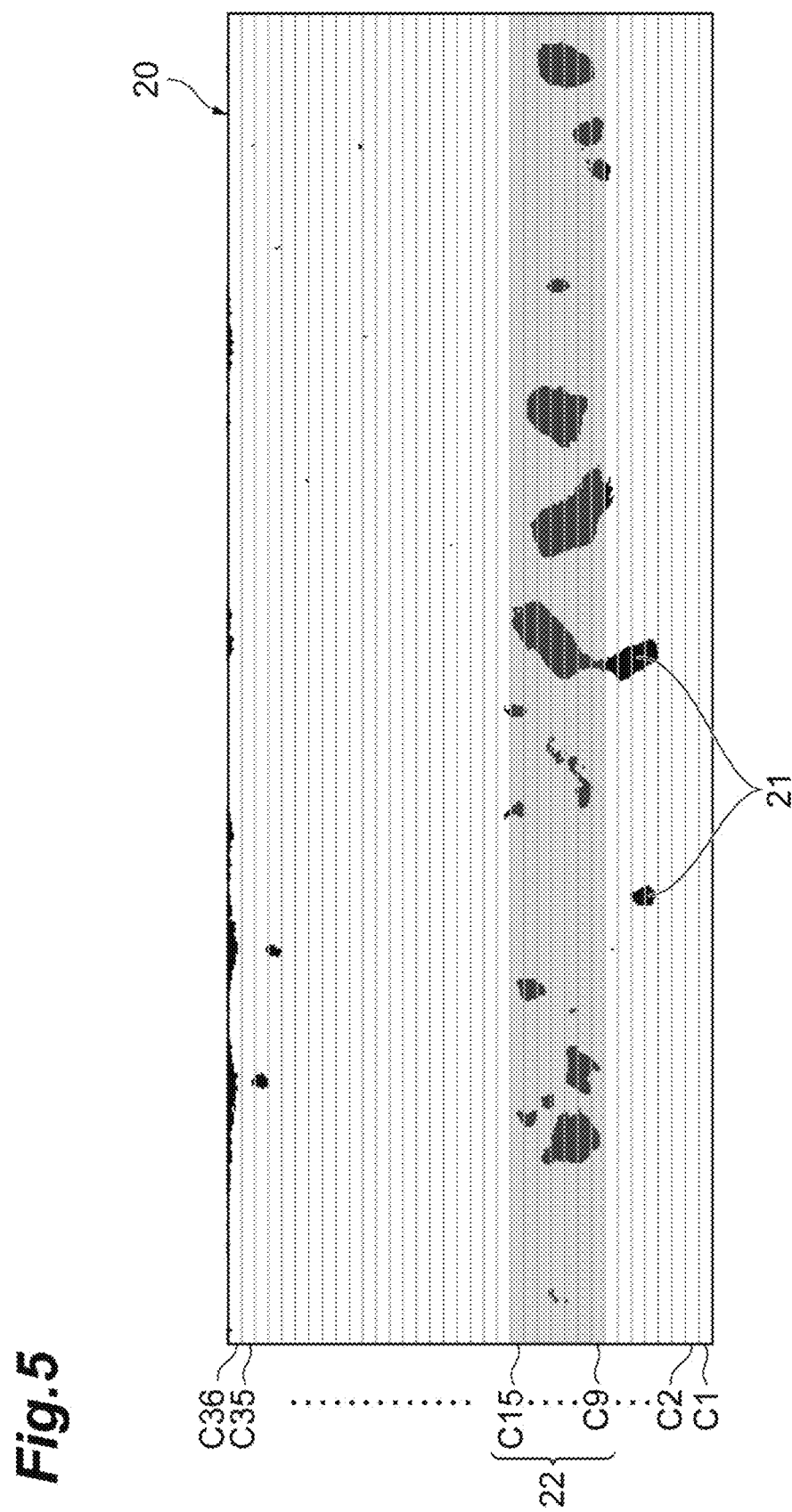
FIG. 5 is a diagram for explaining the method of identifying the void aggregation region.

FIG. 5 shows a state in which only the dielectric layer 20 is cut out from the image shown in FIG. 4 and the region showing the voids 21 and other regions are binarized. Further, in each of the layers C1 to C36, the proportion occupied by the voids 21 in the cross-sectional area of each of the layers is calculated, and when the result is 5% or more, the layer is indicated by a gray color. As a result, as shown in FIG. 5, in the layers C9 to C15, the proportion occupied by the voids 21 in the cross-sectional area of each of the layers is 5% or more. The layers C9 to C15 are continuous layers in the stacking direction, and a thickness thereof is 70 nm. Therefore, these layers C9 to C15 are identified as the void aggregation region 22 in the dielectric layer 20.

In this way, first, the voids 21 having an outer diameter of 10 nm or more included in the cross-sectional image is identified using the SEM image obtained by capturing the cross section of the dielectric layer 20. After that, when the dielectric layer 20 is divided into a plurality of thin layers and a layer in which the proportion occupied by the voids 21 in the cross-sectional area of each of the layers is 5% or more is continuous in the stacking direction over 20 nm or more (that is, twice the outer diameter of the void 21), this region is set as the void aggregation region 22. It is possible to identified the void aggregation region 22 in the dielectric layer 20 by the above procedure.

As described above, the proportion of the void aggregation region 22 with respect to the thickness of the dielectric layer 20 is preferably 5% to 50% and more preferably 5% to 30%. Further, in the void aggregation region 22, a thickness thereof in the stacking direction is preferably 20 nm to 150 nm, and more preferably 20 nm to 100 nm.

A plurality of void aggregation regions 22 may be provided in the dielectric layer 20. When a plurality of void aggregation regions 22 are provided in the dielectric layer 20, the sum of the thicknesses of the plurality of void aggregation regions 22 is preferably within the above-described range.

In identification of the void aggregation region 22, the dielectric layer 20 is divided into a plurality of thin layers, but a thickness of the thin layer may be appropriately changed. In the above-described embodiment, the case in which the thin layer is 10 nm has been described, but the thickness of the thin layer may be appropriately changed within the range of, for example, about 5 nm to 20 nm.

Figure 6:
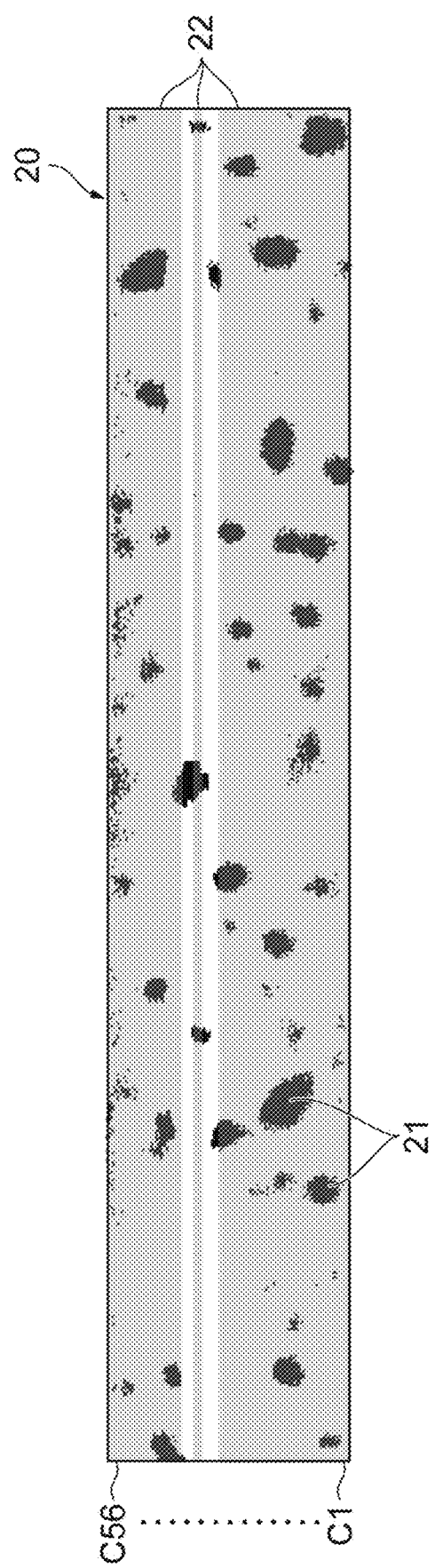
FIG. 6 is a diagram showing an example of a case in which a proportion occupied by the void aggregation region is high.

FIG. 6 shows a result of a case in which a process of identifying the void aggregation region 22 is performed on an image in which a large number of voids 21 are formed in the entire dielectric layer 20 shown in FIG. 2C. In the example shown in FIG. 6, when the dielectric layer 20 having a thickness of 560 nm is sectioned every 10 nm and the layers C1 to C56 are formed in order from the bottom and the region to be the voids 21 is identified and binarized similarly to the SEM image shown in FIGS. 4 and 5 and then two or more layers in which the proportion of the voids 21 occupying 5% or more in the cross-sectional area of each of the layers are continuous, that is, when a layer in which the proportion of voids 21 is 5% or more continues 20 nm or more in the stacking direction, the region is set as the void aggregation region 22. Then, the layer identified as the void aggregation region 22 is indicated by a gray color.

As shown in FIG. 6, when a large number of voids 21 are formed in the entire dielectric layer 20, in the layers C2 to C31, the layers C35 to C36 and the layers C40 to C56, two or more layers in which the proportion occupied by the void 21 in the cross section of each layer is 5% or more are continuous. Therefore, each of the layers is the void aggregation region 22.

In the example shown in FIG. 6, the proportion occupied by the void aggregation region 22 with respect to the thickness of the dielectric layer 20 exceeds 50%. Therefore, the proportion occupied by the void aggregation region 22 is larger than the above-described preferable range.

In the thin film capacitor 1 according to the embodiment, the dielectric layer 20 includes the layered void aggregation region 22 which extends in a direction orthogonal to the stacking direction. Accordingly, there is an effect that the leakage current characteristics are improved. Originally, since the voids 21 randomly formed in the dielectric layer 20 may induce generation of a leakage current and may cause a decrease in the dielectric constant, it was said that less is preferable. Therefore, various studies have been made on a manufacturing method and so on for improving the leakage current characteristics while minimizing generation of voids. However, the inventors have found that the leakage current characteristics are improved by including the void aggregation region 22, in which the voids are concentratedly formed, in the dielectric layer 20. Although the reason for this is not certain, when the voids are formed to be dispersed in the entire dielectric layer 20, the voids may cause the generation of the leakage current, but when the layered void aggregation region 22 is formed in a part of the dielectric layer 20, it is considered that the generation of the leakage current is not induced only by the void aggregation region 22, and contrarily, a bias in the distribution of the voids minimizes the generation of the leakage current. In addition, since the void aggregation region 22 minimizes concentration of the leakage current at a specific location, it is also possible to minimize dielectric breakdown in the dielectric layer 20 due to electro static discharge (ESD) or the like. In particular, when the void aggregation region 22 is present in the vicinity of the first electrode layer 10 or the second electrode layer 30 in which the electric field intensity in the dielectric layer 20 becomes strong, occurrence of the dielectric breakdown can be minimized more effectively. As described above, the leakage current characteristics are improved by the dielectric layer 20 including the void aggregation region 22.

Further, when the void aggregation region 22 has a thickness of 5% to 50% with respect to the thickness of the dielectric layer 20, it is possible to prevent deterioration of the performance of the thin film capacitor 1 while minimizing the leakage current characteristics due to the void aggregation region 22. When the proportion occupied by the void aggregation region 22 in the dielectric layer 20 increases and the dielectric layer 20 contains a large number of the voids 21, an electrostatic capacitance of the dielectric layer may be greatly reduced. On the other hand, it is possible to suitably improve the leak current characteristics while maintaining the electrostatic capacitance of the thin film capacitor 1 by setting the proportion occupied by the void aggregation region 22 within the above-described range.

The evaluation results of the above-described points using embodiments and comparative examples will be described below.

(Preparation of Embodiments and Comparative Examples and Evaluation of Void Distribution)

A thin film capacitor according to embodiments 1 and 2 and comparative example 1 in which a Ni foil having a thickness of 600 μm was prepared as the first electrode layer 10 and the dielectric layer 20 formed of $BaTiO_3$ having a thickness of 600 nm and the second electrode layer 30 formed of Ni having a thickness of 500 nm were stacked thereon was prepared.

In the embodiments 1 and 2 and the comparative example 1, the temperature of the substrate at the time of forming the dielectric film to be the dielectric layer 20 is different from each other. In the embodiment 1, the temperature of the substrate at the start of film formation when the dielectric film is formed was set to 400° C. On the other hand, in the embodiment 2 and the comparative example 1, the temperatures of the substrate at the start of film formation were 350° C. and 450° C., respectively. Other film formation conditions, firing conditions and so on are common in the embodiments 1 and 2 and the comparative example 1.

With respect to the thin film capacitors according to the embodiments 1 and 2 and the comparative example 1, the SEM images of the cross sections thereof were captured, and the distribution of the voids 21 in the dielectric layer 20 and the presence or absence of the void aggregation region 22 were evaluated by image processing or the like. Table 1 shows the temperature of the substrate and the distribution of the voids during the film formation.

The SEM image of the thin film capacitor according to the embodiment 1 corresponds to schematic FIG. 2A. Likewise, the SEM image of the thin film capacitor according to the comparative example 1 corresponds to schematic FIG. 2B. The SEM image of the thin film capacitor according to the embodiment 2 corresponds to schematic FIG. 2C.

TABLE 1

|  | Embodiment 1 | Comparative example 1 | Embodiment 2 |
| --- | --- | --- | --- |
| Temperature of substrate during film formation | 400° C. | 450° C. | 350° C. |
| Void distribution | Voids are concentrated in specific regions Void aggregation region is formed | Number of voids is small Void aggregation region is not formed | Voids are dispersed overall Void aggregation region is formed (greater than 50%) |
| Reference image | FIG. 2A | FIG. 2B | FIG. 2C |

(Evaluation of Characteristics)

The thin film capacitors of the embodiments 1 and 2 and the comparative example 1 were evaluated for the leak current characteristics, the electrostatic capacitance, and so on.

First, with respect to the thin film capacitors according to the embodiments 1 and 2 and the comparative example 1, each having a size of 1005 was prepared, and the leakage current was evaluated. The results are shown in Table 2. In the evaluation of the leakage current, the leakage current was measured when an applied voltage was 1 V, 2 V and 4 V.

TABLE 2

| Applied voltage | Embodiment 1 | Comparative example 1 | Embodiment 2 |
| --- | --- | --- | --- |
| 1 V (Unit: A/cm$^2$) | $2.94 \times E^{-08}$ | $5.44 \times E^{-08}$ | $3.24 \times E^{-08}$ |
| 2 V (Unit: A/cm$^2$) | $7.98 \times E^{-08}$ | $1.76 \times E^{-07}$ | $8.72 \times E^{-08}$ |
| 4 V (Unit: A/cm$^2$) | $7.56 \times E^{-08}$ | $1.59 \times E^{-07}$ | $7.99 \times E^{-08}$ |

Next, with respect to the thin film capacitors of the embodiments 1 and 2 and the comparative example 1, the electrostatic capacity C and tan δ were evaluated. The results are shown in Table 3.

TABLE 3

|  | Embodiment 1 | Comparative example 1 | Embodiment 2 |
| --- | --- | --- | --- |
| C (Unit: nF) | 5.5 | 5.6 | 5.3 |
| tan δ | 0.06 | 0.08 | 0.07 |

Although the embodiments of the present invention have been described above, the present invention is not limited to the above-described embodiments, and various modifications can be made. For example, in the above embodiment, a so-called single layer thin film capacitor in which the dielectric layer 20 is one layer has been described, but the structure described in the above embodiment can also be applied to a so-called multilayer thin film capacitor having a plurality of dielectric layers sandwiched between a pair of electrode layers.

What is claimed is:
1. A thin film capacitor comprising:
a first electrode layer,
a dielectric layer stacked on the first electrode layer, and
a second electrode layer stacked on the dielectric layer,
wherein the dielectric layer includes a layered void aggregation region formed in the dielectric layer between the first electrode layer and the second electrode layer and which extends in a direction orthogonal to a stacking direction, wherein a thickness of the dielectric layer is 50 nm to 1000 nm, wherein the layered void aggregation region includes a plurality of voids, each void of the plurality of voids has a diameter of 10 nm or more, and wherein the layered void aggregation region is set when the dielectric layer is divided into a plurality of thin layers in the stacking direction and in which proportions occupied by the plurality of voids in a cross-sectional area of each of the plurality of thin layers is 5% or more is continuous over 20 nm or more in the stacking direction.

2. The thin film capacitor according to claim 1, wherein the layered void aggregation region has a thickness of 5% to 50% with respect to the thickness of the dielectric layer.

3. The thin film capacitor according to claim 1, wherein each void of the plurality of voids is an air gap.

4. The thin film capacitor according to claim 1, wherein a number of voids of the plurality of voids in an upper portion of the layered void aggregation region is smaller than a number of voids of the plurality of voids in a lower portion of the layered void aggregation region.

* * * * *